United States Patent
Ruehle et al.

(10) Patent No.: US 8,272,965 B2
(45) Date of Patent: Sep. 25, 2012

(54) SHAFT ARRANGEMENT FOR A TRANSMISSION

(75) Inventors: Guenter Ruehle, Loechgau (DE); Benjamin Kesel, Boxberg (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 337 days.

(21) Appl. No.: 12/581,751

(22) Filed: Oct. 19, 2009

(65) Prior Publication Data

US 2010/0240465 A1 Sep. 23, 2010

(30) Foreign Application Priority Data

Mar. 17, 2009 (DE) .................. 20 2009 003 671 U

(51) Int. Cl.
*F16C 1/24* (2006.01)

(52) U.S. Cl. .................................. 464/7; 184/5

(58) Field of Classification Search .............. 464/7, 183; 184/5, 6.14, 6.18, 7.2; 192/48.91, 53.34, 192/113.34, 113.5

See application file for complete search history.

(56) References Cited

U.S. PATENT DOCUMENTS

| | | | |
|---|---|---|---|
| 4,189,041 A * | 2/1980 | Muller | 192/53.34 |
| 4,494,638 A * | 1/1985 | Zenker | 192/48.91 |
| 5,230,258 A * | 7/1993 | Nakano | |
| 5,667,036 A * | 9/1997 | Mueller et al. | |
| 6,076,643 A * | 6/2000 | Brockschmidt | 192/48.91 |
| 6,110,070 A * | 8/2000 | Nagai et al. | |
| 6,474,444 B1 * | 11/2002 | Mochizuki | |
| 7,285,052 B1 * | 10/2007 | Rowell et al. | 464/7 |
| 7,559,415 B2 * | 7/2009 | Braford, Jr. | 192/53.34 X |
| 2007/0298917 A1 * | 12/2007 | Faust | |
| 2010/0234113 A1 * | 9/2010 | Drabek et al. | 464/7 |

FOREIGN PATENT DOCUMENTS

DE 31 13 650 C3 10/1982

* cited by examiner

*Primary Examiner* — Gregory Binda
*Assistant Examiner* — Matthieu Setliff
(74) *Attorney, Agent, or Firm* — Knobbe, Martens, Olson & Bear, LLP

(57) ABSTRACT

A shaft arrangement for a transmission comprises a shaft having an axial bore into which oil can be introduced via an oil supply system, at least one loose wheel which is rotatably supported on the shaft via a bearing, and a shift clutch arrangement which is arranged for connecting the loose wheel with the shaft in a rotationally fixed manner. The shift clutch arrangement comprises a guide sleeve which is connected with the shaft via a tooth engagement in a rotationally fixed manner. The axial bore is connected via at least one transversal bore with the outer circumference of the shaft, so as to supply oil to the bearing and to the shift clutch arrangement. The transversal bore is arranged in an area of the tooth engagement between the guide sleeve and the shaft. A channel is provided in at least one of an area of a toothing of the guide sleeve and an area of the toothing of the shaft, which, together with the guide sleeve toothing, forms the tooth engagement. The channel connects the transversal bore with an area between the guide sleeve and the bearing.

18 Claims, 3 Drawing Sheets

SHAFT ARRANGEMENT FOR A TRANSMISSION

CROSS-REFERENCE TO RELATED APPLICATIONS

This application claims the priority of German utility model application DE 20 2009 003 671.5, filed Mar. 17, 2009.

BACKGROUND OF THE INVENTION

The present invention relates to a shaft arrangement for a transmission, particularly for motor vehicles, comprising a shaft having an axial bore into which oil can be introduced via an oil supply system, at least one loose wheel which is rotatably supported on the shaft via a bearing, and a shift clutch arrangement which is arranged for connecting the loose wheel with the shaft in a rotationally fixed manner, said shift clutch arrangement comprising a guide sleeve which is connected with the shaft via tooth engagement in a rotationally fixed manner, wherein the axial bore is connected via at least one transversal bore with the outer circumference of the shaft, so as to supply oil to the bearing and to the shift clutch arrangement, wherein the transversal bore is arranged in an area of the tooth engagement between the guide sleeve and the shaft.

Such a shaft arrangement is known from document DE 31 13 650 C3. Here, a radial channel is provided in the guide sleeve, wherein the transversal bore opens into the radial channel, and wherein oil is supplied to the shift clutch arrangement via the radial channel.

Generally, the present invention relates to shaft arrangements of transmissions which comprise a circulatory oil lubrication system (dry sump lubrication system). Here, the lubricant and cooling oil for the bearing and the shift clutch arrangements (which are typically synchronized shift clutch arrangements) is supplied from the inside (i.e. from the axial bore) to the outside in a radial direction.

In the shaft arrangement which is known from document DE 31 13 650 C3, additional separate transversal bores are provided for the bearings of the loose wheels, which additional transversal bores are connected with the axial bore. Conclusively, the constructive effort for supplying the bearings and the shift clutch arrangement is relatively high.

Further, it is known to supply a bearing and an adjacent shift clutch of a shift clutch arrangement with oil by aligning a transversal bore approximately axially centrally with the bearing. Here, the oil is pressed through the bearing and to an adjacent axial face of the guide sleeve. A radially aligned oil pocket, for example, is provided in the axial face of the guide sleeve, via which oil that leaves the bearing, can be supplied to the shift clutch. Here, the constructive effort for supplying the bearing and the shift clutch with oil is relatively low. However, it is disadvantageous that the bearing is flooded during the oil supply, which leads to a high increase of the drag moment, which is due to the tumbling work of the roller bodies. This leads to a degradation of the efficiency of the shaft arrangement, and, thus, of the transmission.

BRIEF SUMMARY OF THE INVENTION

Against this background, it is the object of the invention to provide an improved shaft arrangement that ensures a sufficient oil supply of the bearing and the shift clutch arrangement and that induces lower drag losses.

This object is achieved with a shaft arrangement for a transmission, particularly for motor vehicles, comprising a shaft having an axial bore into which oil can be introduced via an oil supply system, at least one loose wheel which is rotatably supported on the shaft via a bearing, and a shift clutch arrangement which is arranged for connecting the loose wheel with the shaft in a rotationally fixed manner, said shift clutch arrangement comprising a guide sleeve which is connected with the shaft via tooth engagement in a rotationally fixed manner, wherein the axial bore is connected via at least one transversal bore with the outer circumference of the shaft, so as to supply oil to the bearing and to the shift clutch arrangement, wherein the transversal bore is arranged in an area of the tooth engagement between the guide sleeve and the shaft, wherein a channel is provided in an area of a toothing of the guide sleeve and/or in an area of the toothing of the shaft, which, together with the guide sleeve toothing, forms the tooth engagement, wherein the channel connects the transversal bore with an area between the guide sleeve and the bearing.

With the invention, oil can be supplied into an area between the guide sleeve and the bearing. From this area, the total volume flow can be divided into a volume flow that flows into the bearing, and a volume flow that flows in radial direction further outwardly to the associated shift clutch. What can be achieved is that a larger part of the volume flow flows directly to the shift clutch. A sufficient supply with oil for the bearing can be ensured by the smaller volume flow which flows into the bearing. However, the bearing is not "flooded", so that the drag moment of the bearing is significantly reduced. This is particularly true if the oil is relatively cold, i.e. at starting the motor vehicle, for example.

The bearing of the loose wheel can be a roller bearing, particularly a needle bearing.

The term "bore" is to be understood in a broad sense, and shall include not only bores having a circular cross section, but also bores with any other cross sections.

According to the invention, it is further advantageous that a bearing bush which is typically provided between the bearing and the shaft, can be manufactured in a cost-efficient manner. While it was necessary in the prior art, where the transversal bore leads into the bearing, to provide corresponding bores and/ore radial recesses in the bearing bush, this is no longer necessary with the inventive shaft arrangement. The bearing bush which is optionally used in connection with the bearing, thus, has preferably no transversal bores.

Conclusively, the object is entirely solved.

According to a further aspect of the invention, in a shaft arrangement for a transmission, particularly for motor vehicles, comprising a shaft having an axial bore into which oil can be introduced via an oil supply system, at least one loose wheel which is rotatably supported on the shaft via a bearing, and a shift clutch arrangement which is arranged for connecting the loose wheel with the shaft in a rotationally fixed manner, said shift clutch arrangement comprising a guide sleeve which is connected with the shaft via tooth engagement in a rotationally fixed manner, wherein the axial bore is connected via at least one transversal bore with the outer circumference of the shaft, so as to supply oil to the bearing and to the shift clutch arrangement, wherein the transversal bore is arranged in an area of the tooth engagement between the guide sleeve and the shaft, the transversal bore is arranged in an area of an axial end of the tooth engagement.

Conclusively, it is comparatively easy from a constructional view point, to let the oil flow from the transversal bore into the area between the guide sleeve and the bearing. Preferably, the transversal bore extends linearly through the shaft toothing. Preferably, the transversal bore can be further enlarged in an area of the outer circumference of the shaft, which measure can, for example, be realized by countersinking the bore.

This embodiment has the advantage that the shaft can be manufactured in an easy manner. For example, the necessary turning contour can be realized in a first step from a forging blank. Subsequently, and preferably with the same machine tool, the transversal bore can be drilled. This will be made preferably with a tool which includes the entire form of the bore (i.e. optionally inclusively the counter-sink), so that only one workstep is necessary. The shaft toothing (preferably a spline toothing with involute flanks according to DIN 5480 and ISO 4156, respectively) is manufactured subsequently, for instance by means of a cold-forming process like cold-rolling. Additional manufacturing steps for the toothing or the transversal bore are no longer necessary.

According to an alternative embodiment, the transversal bore is arranged in an axially central area of the tooth engagement.

In this embodiment, the channel which connects the transversal bore with the area between the guide sleeve and the bearing, is an axial channel. Here, it is possible to provide only one transversal bore for a shift clutch arrangement which has a loose wheel arranged on each of its both axial faces, wherein the single transversal bore is connected with the opposite areas between the guide sleeve and the respective bearings via the axial channel.

In this embodiment, the fitting toothing is manufactured first, after having produced the shaft blank, e.g. by cold-rolling. Only subsequently, the transversal bore is manufactured.

It is particularly advantageous here, if the channel is formed as an axial channel in the shaft toothing.

Here, it is possible to manufacture the axial channel without influence on the guide sleeve toothing.

It is particularly advantageous here, if the axial channel is formed by omitting at least one tooth of the shaft toothing, wherein the transversal bore opens into this omission area.

In this embodiment, for example, a tooth can be milled off after having manufactured the fitting toothing. The transversal bore can be placed for example centrally into the plane surface which is created thereby.

The method for manufacturing the shaft is involved with more effort in this embodiment in comparison with the embodiment where the transversal bore is arranged in an area of an axial end of the tooth engagement. However, preferably only one transversal bore is to be provided for a shift clutch arrangement which has arranged a loose wheel on each of its opposite sides.

In general, it is further preferred if the guide sleeve comprises a radial recess at its inner circumference in an area of an axial end of the tooth engagement, wherein oil can be guided from the transversal bore via the radial recess to the axial face of the guide sleeve.

If a transversal bore is provided in an axially central area of the tooth engagement, the axial channel is connected with this radial recess.

In the embodiment where the transversal bore is arranged in an area of an axial end of the tooth engagement, the transversal bore preferably opens directly into the radial recess.

Conclusively, it is particularly preferred if the transversal bore opens into the area of the radial recess, so that the radial recess forms the channel.

In addition, it is further preferred if the radial recess extends over at least an angular area larger than 45° of the inner circumference of the guide sleeve.

Here, it is possible to assemble the guide sleeve on the shaft essentially without angularly aligning these components with each other. It is particularly preferred if the radial recess extends via the entire inner circumference of the guide sleeve. In this embodiment, the guide sleeve can be mounted to the shaft without having to angularly align the guide sleeve with the shaft at all.

It is generally further preferred, if the guide sleeve comprises at least one oil pocket at the axial face which faces the loose wheel, wherein the oil pocket extends from the channel outwardly in radial direction.

Here, the oil can be guided outwardly from the area of the inner circumference of the guide sleeve in radial direction through the oil pocket. Preferably, the guide sleeve comprises at least two or more oil pockets which extend outwardly in the radial direction.

If the radial recess extends over the entire circumference of the guide sleeve, it can be ensured that oil is guided from the transversal bore via the radial recess in circumferential direction to the radial inner end of the oil pocket.

It is further preferred in this context, if a bearing arranged adjacent to the guide sleeve in the axial direction, is supplied with oil, wherein an axial end of the bearing faces the oil pocket.

Here, a relatively small volume flow flows from the oil pocket in the axial direction into the bearing. A larger part of the volume flow flows radially outwardly in a direction to the shift clutch.

It is further preferred if at least one transversal bore is provided in each area of both axial ends of the tooth engagement.

This embodiment is particularly suitable if two loose wheels are arranged on opposite sides of the shift clutch arrangement. In this case, one transversal bore is connected with an area between the guide sleeve and one of the bearings of one of the loose wheels. The other transversal bore is connected with an area between the guide sleeve and a second one of the bearings of a second loose wheel.

Here, it is particularly preferred if the transversal bores at the axial ends of the tooth engagement are angularly displaced against each other.

Thus, the toothing quality of the shaft toothing can be maintained at a high level. For instance, the bores can be displaced by 180°, and the toothing can be manufactured in a non-cutting manner by cold-rolling or rolling.

The invention can be used in association with any type of bearing for the loose wheel. It is particularly preferred if the bearing is a needle bearing. The needle bearing can roll either directly on an outer circumference portion of the shaft (particularly if the shaft is hardened). As an alternative, a bearing bush can be shifted onto the shaft, wherein the needles of the needle bearing roll on the outer circumference of the bearing bush. In the latter case, the oil passes the bearing bush in the radial direction and flows in axial direction into the bearing. In any case, the bearing bush does not necessarily have a transversal bore for the purpose of supplying oil.

It will be understood that the features of the invention mentioned above and those yet to be explained below can be used not only in the respective combination indicated, but also in other combinations or in isolation, without leaving the scope of the present invention.

BRIEF DESCRIPTION OF THE SEVERAL VIEWS OF THE DRAWING

Exemplary embodiments of the invention are explained in more detail in the following description and are represented in the drawings, in which.

DETAILED DESCRIPTION OF THE INVENTION

Figure 1:
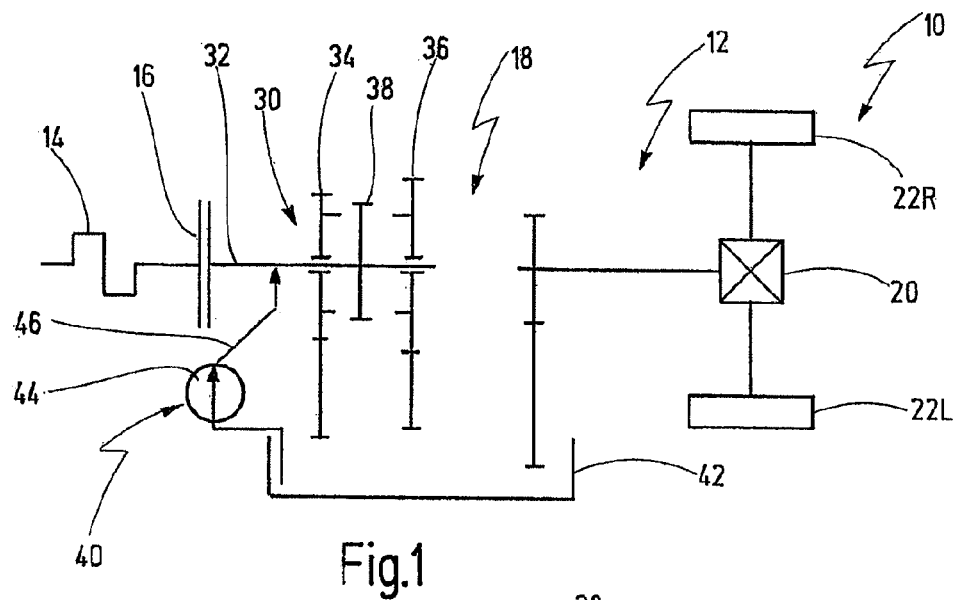
FIG. 1 is a schematic representation of a motor vehicle having a drive train into which a shaft arrangement according to the invention is integrated.

In FIG. 1, a motor vehicle is depicted schematically and generally shown at 10. The motor vehicle 10 comprises a drive train 12. The drive train 12 comprises a drive motor 14 like a combustion engine, and a separating clutch arrangement 16. Further, the drive train 12 comprises a step transmission 18 having a countershaft layout as well as a differential 20 which distributes the driving force to two driven wheels 22L, 22R.

The drive train 12 is depicted in a largely schematical manner, in order to make clear that the transmission 18 can, for example, be a manual shift transmission, an automated shift transmission or a double clutch transmission. Further, the clutch arrangement 16 can include a single separating clutch or a double clutch arrangement for a double clutch transmission.

The step transmission 18 comprises a shaft arrangement 30 according to an embodiment of the invention. The shaft arrangement 30 comprises a shaft 32 which in the present case is formed as a transmission input shaft and is connected with an output member of the separating clutch arrangement 16. However, the shaft arrangement 30 may similarly be formed in a countershaft of the step transmission, which is not shown here.

A first loose wheel 34 and a second loose wheel 36 are rotationally supported on the shaft 32. A shift clutch arrangement 38 is arranged between the two loose wheels 34, 36, which shift clutch arrangement is preferably formed as a shift clutch package having two synchronizers for the first loose wheel 34 and the second loose wheel 36, respectively.

Further provided is an oil supply system 40 which pumps oil by means of an oil pump 44 from an oil sump 42 and supplies the oil via an oil supply channel 46 to the shaft arrangement 30. The oil supply channel 46 guides the oil supplied by the oil pump 44 into an axial bore of the shaft 32, which is not depicted in FIG. 1.

Figure 2:
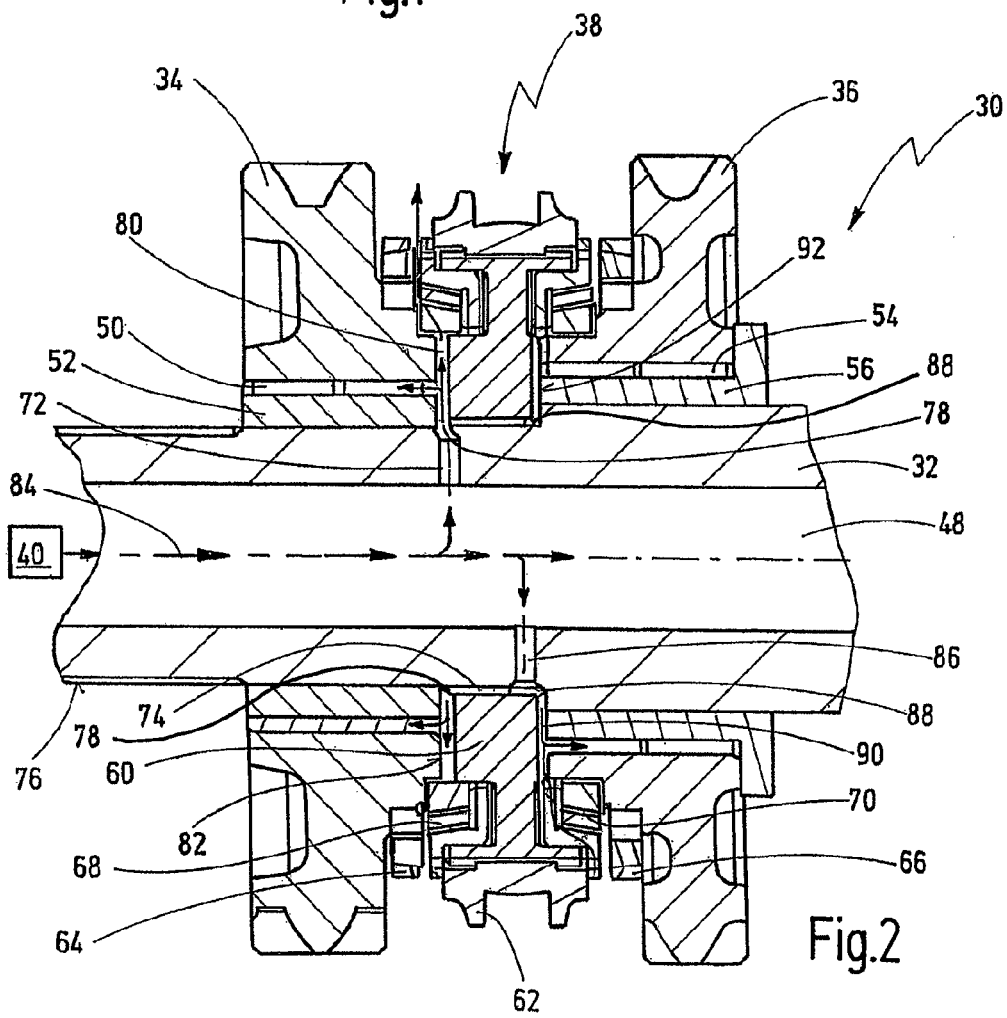
FIG. 2 is a partial sectional view of a further embodiment of an inventive shaft arrangement.

FIG. 2 depicts a partial sectional view of an embodiment of the shaft arrangement 30. The shaft arrangement 30 of FIG. 2 corresponds to the shaft arrangement of FIG. 1. Identical elements are depicted with identical reference numerals. In the following, essentially the differences are explained.

The shaft 32 comprises an axial bore 48 which is connected with the oil supply system 40, as is shown schematically in FIG. 2.

The first loose wheel 34 is rotationally supported on the shaft 32 by means of a first bearing 50 and by a first bearing bush 52. Correspondingly, the second loose wheel 36 is rotationally supported on the shaft 32 by means of a second bearing 54 and by a second bearing bush 56.

The bearings 50, 54 are formed as needle bearings. The bearing bushes 52, 56 do not comprise any radial openings like transversal bores or the like.

The shift clutch arrangement 38 between the two loose wheels 34, 36 comprises a guide sleeve 60 which is connected with the shaft 32 in a rotationally fixed manner. A shift sleeve 62 is supported on the guide sleeve 60 in an axially displaceable manner. A first clutch body 64 is attached to the first loose wheel 34. A second clutch body 66 is attached to the second loose wheel 36. Either the first loose wheel 34 or the second loose wheel 36 may be connected with the shaft 32 in a rotationally fixed manner by displacing the shift sleeve 62, as is known in the art. Here, the shift clutch arrangement 38 comprises, in a manner known in the art per se, a first synchronizing device 68 for synchronizing the rotation speeds of the first loose wheel 34 and the shaft 32, as well as a second synchronizing device 70 for synchronizing the second loose wheel 36 with the shaft 32.

The two bearings 50, 54 as well as the two synchronizing devices 68, 70 are supplied with oil via the axial bore 48, for the purpose of lubricating and/or cooling the same.

For supplying the first bearing 50 and the first synchronizing device 68, a first transversal bore 72 is provided in the shaft 32. The first transversal bore 72 is provided in an area of an axial end of a tooth engagement 74 between the guide sleeve 60 and the shaft 32. The first transversal bore 72 extends from the axial bore 48 to the outer circumference 76 of the shaft 32. In an area of the associated axial face of the guide sleeve 60, a first radial recess 78 is formed at an inner circumference thereof, wherein the first transversal bore 72 opens into the first radial recess 78. The first radial recess 78 has a relatively low radial height, e.g. in the range of smaller than 2 mm. In other words, the first radial recess 78 is formed so as to have the largest possible cross section with the smallest possible outer diameter. This makes it possible to prevent a wearing interference of adjacent elements into the guide sleeve 60 and associated damages like the loss of the axial play of the loose wheels, etc. The first radial recess 78 extends over the entire inner circumference of the guide sleeve 60. Conclusively, the first radial recess 78 is in any case connected with the first transversal bore 72, in a manner independent from the relative rotational position of the guide sleeve 60 when shifting same into the tooth engagement 74.

Further, two oil pockets 80 displaced by 180° are formed at the axial face 82 of the guide sleeve 60, wherein the oil pockets 80 extend outwardly in radial direction starting from the radial recess 78.

Conclusively, the oil 84 supplied via the oil supply system 40 flows through the axial bore 48, subsequently through the first transversal bore 72 into the radial recess 78. In the radial recess 78, the oil can flow in circumferential direction and can flow subsequently into the two opposite oil pockets 80 (only one of which being provided with a reference numeral in FIG. 2). As an alternative to the arrangement with two oil pockets, only one oil pocket 80 can be provided, or a larger number of oil pockets 80.

The oil 84 flows in the oil pockets 80 essentially in radial direction outwardly to the first synchronizing device 68, to supply same with oil. In addition, a smaller portion of the total volume flow flows, starting from the oil pockets 80, in axial direction into the first bearing 50, in order to supply same with oil.

Conclusively, the first bearing 50 does not have to take up the total volume flow of oil which flows to the first synchronizing device 68, so that drag moments as are produced in the prior art, are avoided.

The supply of the second bearing 54 and the second synchronizing device 70 with oil is made essentially in a mirror image manner. Here, a second transversal bore 86 is provided in the shaft 32, to be exact in an axial opposite area of the tooth engagement 74. Correspondingly, a second radial recess 88 is provided at the inner circumference of the guide sleeve 60, and two second oil pockets 90 are provided at the opposite second axial face 92 of the guide sleeve 60, which serve to guide oil.

It is to be understood that additional loose wheels and shift clutch arrangements 38 can be arranged at the shaft 32, which are supplied with oil in a corresponding manner via the axial bore 48.

Figure 3:
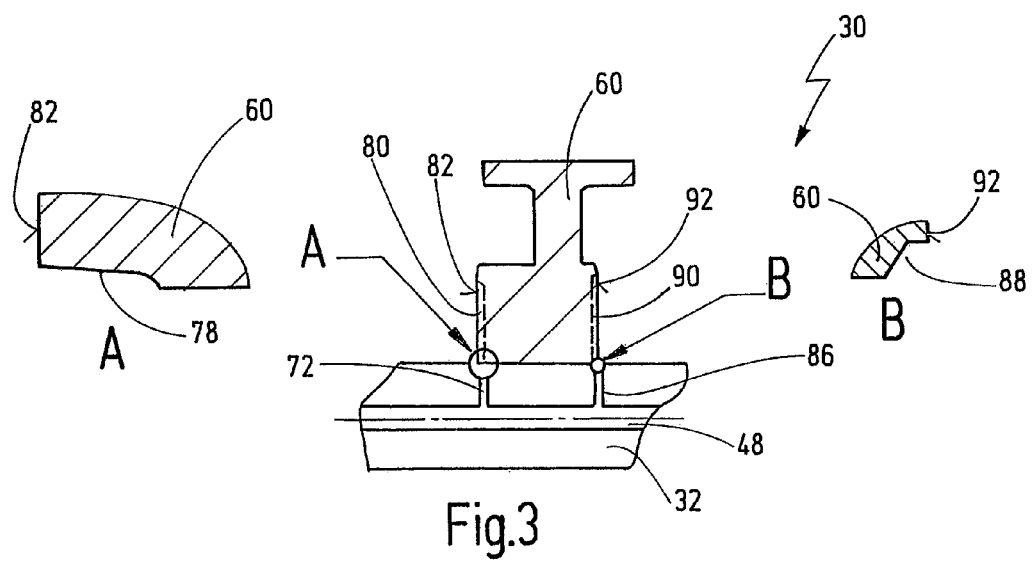
FIG. 3 is a partial sectional view of a further embodiment of an inventive shaft arrangement.

FIG. 3 depicts a schematic partial sectional view of a further embodiment of a shaft arrangement 30, wherein particularly the first radial recess 78 and the second radial recess 88 are shown in respective detailed views A and B, respectively. The radial recesses 78, 88 have, as has been said, a relatively low radial height and nevertheless a relatively large cross section, in order to be able to guide the volume flow which is supplied via the respective transversal bores 72, 86. The radial recesses 78, 88 extend approximately from the area of the tooth engagement 74 in an axial direction outwardly to the respective axial faces 82, 92.

Further, it can be seen in FIG. 3 that the two transversal bores 72, 86 are not necessarily angularly displaced against each other, as is shown in FIG. 2, but can be arranged such that they are aligned in an axial projection.

Figure 4:
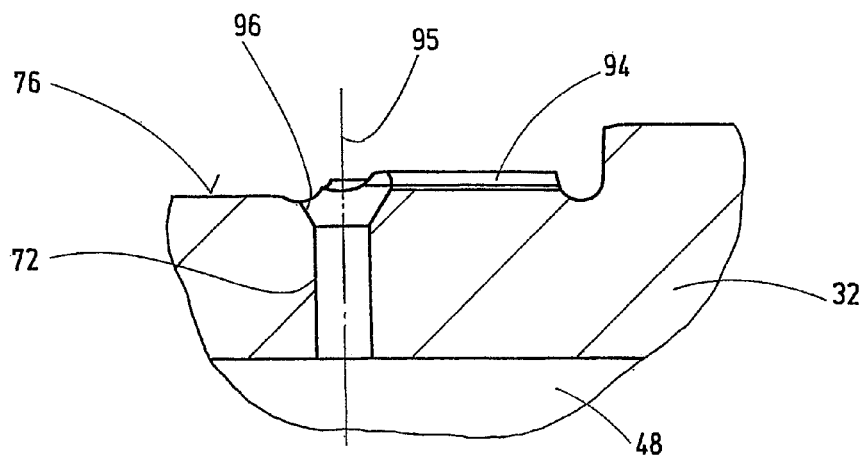
FIG. 4 is a partial sectional view of a shaft of an inventive shaft arrangement.

FIG. 4 shows a detailed sectional view of the shaft 32, wherein the toothing 94 of the shaft 32 can be seen which forms, together with a corresponding toothing of the guide sleeve 60, the tooth engagement 74.

The transversal bore is arranged such that it opens in an area of an axial end of the shaft toothing 94 into the outer circumference 76 of the shaft 32. The transversal bore 72 is preferably arranged perpendicular to the axial bore 48; however, the transversal bore 72 can be aligned obliquely thereto. It is preferred that the opening of the transversal bore 72 is arranged in the area of an axial end of the tooth engagement 74. Particularly, the axis 95 of the first transversal bore 72 is arranged within the toothing area of the shaft toothing 94.

It can be seen in FIG. 4 that the first transversal bore 72 is enlarged in the area of the outer circumference 76 of the shaft 32. For example, the first transversal bore 72 can be manufactured by a drilling process, wherein a counter-sink 96 is formed simultaneously herewith in the area of the outer circumference 76.

Figure 5:
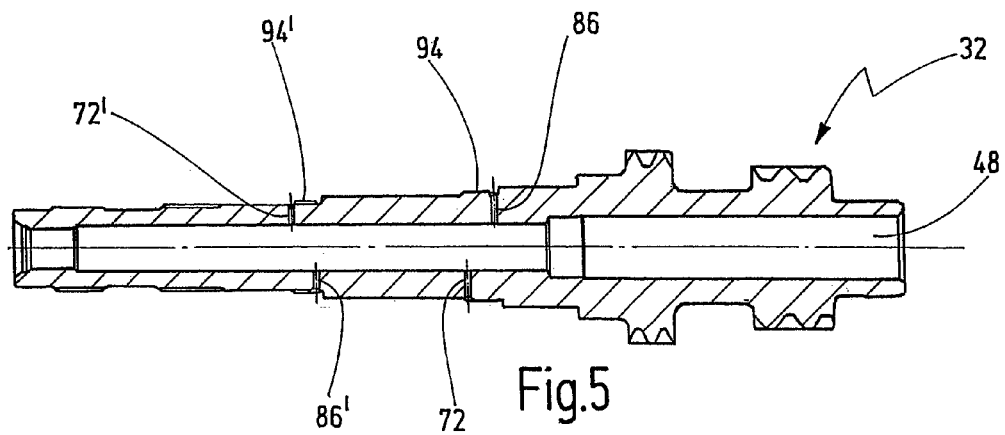
FIG. 5 is a sectional view of a shaft of an inventive shaft arrangement.

FIG. 5 shows a sectional view of the entire shaft 32 and shows in addition that, beside the first transversal bore 72 and the second transversal bore 86 in the area of the tooth engagement 74, corresponding additional transversal bores 72', 86' may be provided in the area of an additional tooth engagement 94' of an additional shift clutch arrangement, wherein these additional transversal bores 72', 86' are connected with the axial bore 48.

Figure 6:
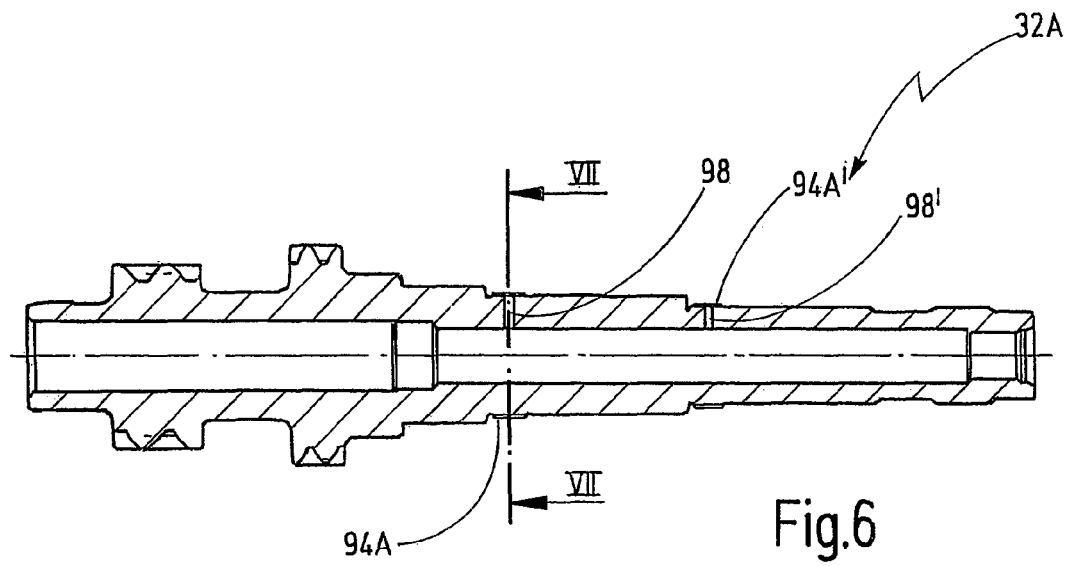
FIG. 6 is a sectional view of an alternative embodiment of a shaft of an inventive shaft arrangement.
Figure 7:
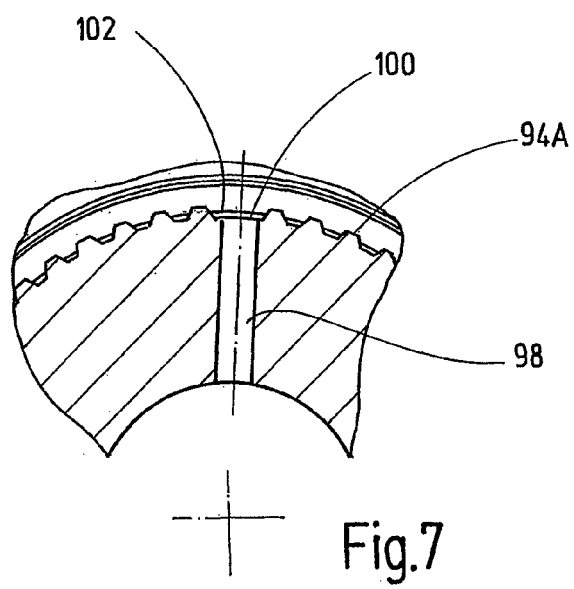
FIG. 7 is a sectional view along the line VII-VII of FIG. 6.

FIGS. 6 and 7 show an embodiment of a shaft 32A which forms an alternative embodiment to the shaft shown in FIG. 5. In the present embodiment, only a respective single transversal bore 98 is provided for supplying the two bearings 50, 54 and the two synchronizing devices 68, 70 which are associated to a shift clutch arrangement 38, instead of two transversal bores 72, 86. The single transversal bore 98 opens here in a central region of the toothing 94A of the shaft 32A. As is shown in FIG. 6, an additional central transversal bore 98' can be provided for a further shaft toothing 94A' of a further shift clutch arrangement.

Otherwise, the shaft 32A can be realized with identical components and a construction which is otherwise similar to that shown in FIG. 2. In order to bring the oil supplied via the central transversal bore 98 to the areas of the first axial face 82 and the second axial face 92, an axial channel 102 is formed in the shaft toothing 94A. The axial channel 102 is formed by omitting in an omission area 100, for example, one tooth of the shaft toothing, wherein the central transversal bore 98 opens into the omission area 100.

The embodiment of FIGS. 6 and 7 comprises less transversal bores 98, 98' than the embodiment of FIG. 5. However, the embodiment of FIG. 5 can preferably be realized in that the transversal bores 72, 86 are provided in a shaft blank in a first step, and in that, subsequently, the respective shaft toothing 94 is formed by cold forming. In the embodiment of FIGS. 6 and 7, on the other hand, it is necessary to provide the toothing 94A in a first step, and to manufacture the omission area 100 subsequently, wherein the transversal bore 98 can only be provided in a subsequent step. Thus, the manufacturing effort is typically somewhat higher.

What is claimed is:

1. Shaft arrangement for a transmission, comprising
a shaft having an axial bore into which oil can be introduced via an oil supply system,
at least one loose wheel which is rotatably supported on the shaft via a bearing, and
a shift clutch arrangement which is arranged for connecting the loose wheel with the shaft in a rotationally fixed manner, said shift clutch arrangement comprising a guide sleeve which is connected with the shaft via a tooth engagement in a rotationally fixed manner, wherein the axial bore is connected via at least one transversal bore with the outer circumference of the shaft, so as to supply oil to the bearing and to the shift clutch arrangement, wherein the transversal bore is arranged in an area of the tooth engagement between the guide sleeve and the shaft, wherein a channel is provided in at least one of an area of a toothing of the guide sleeve and an area of the toothing of the shaft, which, together with the guide sleeve toothing, forms the tooth engagement, wherein the channel connects the transversal bore with an area between the guide sleeve and the bearing, wherein the transversal bore is arranged in an area of an axial end of the tooth engagement;
wherein the guide sleeve comprises a radial recess at its inner circumference in an area of an axial end of the tooth engagement, wherein oil can be guided from the transversal bore via the radial recess to an axial face of the guide sleeve, and wherein the radial recess extends at least over an angular area which is larger than 45° of the inner circumference of the guide sleeve.

2. Shaft arrangement according to claim 1, wherein the transversal bore is arranged in an axially central area of the tooth engagement.

3. Shaft arrangement according to claim 1, wherein the channel is formed as an axial channel in the shaft toothing.

4. Shaft arrangement according to claim 3, wherein the axial channel is formed by transmitting at least one tooth of the shaft toothing, wherein the transversal bore opens into this omission area.

5. Shaft arrangement according to claim 1, wherein the transversal bore opens into the area of the radial recess, so that the radial recess forms the channel.

6. Shaft arrangement according to claim 1, wherein the guide sleeve comprises at least one oil pocket at an axial face that faces to the loose wheel, wherein the oil pocket extends from the channel outwardly in the radial direction.

7. Shaft arrangement according to claim 6, wherein the bearing arranged in axial direction next to the guide sleeve, is provided with oil, wherein an axial end of the bearing faces the oil pocket.

8. Shaft arrangement according to claim 1, wherein at least one transversal bore is arranged in the area of each of the axial ends of the tooth engagement.

9. Shaft arrangement according to claim 8, wherein the transversal bores at the axial ends of the tooth engagement are arranged with an angular displacement against each other.

10. Shaft arrangement for a transmission, comprising
a shaft having an axial bore into which oil can be introduced via an oil supply system,
at least one loose wheel which is rotatably supported on the shaft via a bearing, and
a shift clutch arrangement which is arranged for connecting the loose wheel with the shaft in a rotationally fixed manner, said shift clutch arrangement comprising a guide sleeve which is connected with the shaft via a tooth engagement in a rotationally fixed manner, wherein the axial bore is connected via at least one transversal bore with the outer circumference of the shaft, so as to supply oil to the bearing and to the shift clutch arrangement, wherein the transversal bore is arranged in an area of the tooth engagement between the guide sleeve and the shaft, wherein the transversal bore is arranged in an area of an axial end of the tooth engagement;
wherein the guide sleeve comprises a radial recess at its inner circumference in an area of an axial end of the tooth engagement wherein oil can be guided from the transversal bore via the radial recess to an axial face of the guide sleeve, and wherein the radial recess extends at least over an angular area which is larger than 45° of the inner circumference of the guide sleeve.

11. Shaft arrangement according to claim 10, wherein the transversal bore is arranged in an axially central area of the tooth engagement.

12. Shaft arrangement according to claim 10, wherein a channel is formed as an axial channel in the shaft toothing.

13. Shaft arrangement according to claim 12, wherein the axial channel is formed by transmitting at least one tooth of the shaft toothing, wherein the transversal bore opens into this omission area.

14. Shaft arrangement according to claim 10, wherein the transversal bore opens into the area of the radial recess, so that the radial recess forms the channel.

15. Shaft arrangement according to claim 10, wherein the guide sleeve comprises at least one oil pocket at an axial face that faces to the loose wheel, wherein the oil pocket extends from the channel outwardly in the radial direction.

16. Shaft arrangement according to claim 15, wherein the bearing arranged in axial direction next to the guide sleeve, is provided with oil, wherein an axial end of the bearing faces the oil pocket.

17. Shaft arrangement according to claim 10, wherein at least one transversal bore is arranged in the area of each of the axial ends of the tooth engagement.

18. Shaft arrangement according to claim 17, wherein the transversal bores at the axial ends of the tooth engagement are arranged with an angular displacement against each other.

* * * * *